(12) United States Patent
Philipp (10) Patent No.: US 10,233,034 B2
(45) Date of Patent: Mar. 19, 2019

(54) PRODUCT DISTRIBUTION UNIT (71) Applicant: Rotzinger AG, Kaiseraugst (CH)

(72) Inventor: Kurt Philipp, Grenzach-Wyhlen (DE)

(73) Assignee: ROTZINGER AG, Kaiseraugst (CH)

( * ) Notice: Subject to any disclaimer, the term of this patent is extended or adjusted under 35 U.S.C. 154(b) by 0 days.

(21) Appl. No.: 15/327,807

(22) PCT Filed: Jul. 7, 2015

(86) PCT No.: PCT/EP2015/065443
§ 371 (c)(1),
(2) Date: Jan. 20, 2017

(87) PCT Pub. No.: WO2016/012229
PCT Pub. Date: Jan. 28, 2016

(65) Prior Publication Data
US 2017/0203927 A1 Jul. 20, 2017

(30) Foreign Application Priority Data
Jul. 24, 2014 (CH) ....................................... 1138/14

(51) Int. Cl.
*B65G 47/64* (2006.01)
*B65B 35/44* (2006.01)
*B65B 35/24* (2006.01)
*B65G 47/53* (2006.01)
*B65G 21/10* (2006.01)

(52) U.S. Cl.
CPC ............ *B65G 47/647* (2013.01); *B65B 35/24* (2013.01); *B65B 35/44* (2013.01); *B65G 21/10* (2013.01); *B65G 47/53* (2013.01)

(58) Field of Classification Search
CPC ...... B65G 21/10; B65G 47/57; B65G 47/647; B65G 47/53; B65G 47/082; B65G 21/12; B65B 35/24; B65B 35/246; B65B 35/44
USPC ......................................................... 198/433
See application file for complete search history.

(56) References Cited

U.S. PATENT DOCUMENTS 4,499,988 A    2/1985 Gasser
5,078,255 A *  1/1992 Haley ................. B65G 47/647
                                                    198/358

(Continued)

FOREIGN PATENT DOCUMENTS

CH        558 749     2/1975
EP     0 558 123 A1   9/1993

(Continued)

OTHER PUBLICATIONS

International Search Report dated Jan. 20, 2016, in PCT/EP2015/065443 filed Jul. 7, 2015.

*Primary Examiner* — Gene O Crawford
*Assistant Examiner* — Keith R Campbell
(74) *Attorney, Agent, or Firm* — Oblon, McClelland, Maier & Neustadt, L.L.P.

(57) ABSTRACT

A product distribution unit removes rows of products from a production flow conveyed on a main conveyor and conveys them by a distribution device to a packaging machine. A waiting belt, which is arranged beneath the main conveyor and can be displaced in the main direction of conveyance, is used for taking over rows of products from the main conveyor and delivering the rows of products to a discharge belt desynchronized from the main conveyor.

9 Claims, 8 Drawing Sheets

(56) References Cited

U.S. PATENT DOCUMENTS

| | | | | |
|---|---|---|---|---|
| 5,094,337 | A | * | 3/1992 | van Veldhuisen ..... B65G 47/52 198/357 |
| 5,287,952 | A | | 2/1994 | Redaelli |
| 5,640,833 | A | * | 6/1997 | Gerber .................. B65B 35/246 198/347.3 |
| 8,794,422 | B2 | * | 8/2014 | Philipp ................ B65G 47/647 198/347.1 |
| 8,827,068 | B2 | * | 9/2014 | Weiss ....................... A21B 1/48 198/456 |
| 2012/0138434 | A1 | * | 6/2012 | Trieb ..................... B29D 29/06 198/847 |
| 2013/0220772 | A1 | * | 8/2013 | Vasse .................. B65G 47/088 198/431 |
| 2015/0001137 | A1 | | 1/2015 | Layne et al. |

FOREIGN PATENT DOCUMENTS

| | | | |
|---|---|---|---|
| EP | 0 666 230 A1 | 8/1995 | |
| EP | 0 786 425 A2 | 7/1997 | |
| EP | 0786425 A2 * | 7/1997 | ........... B65G 47/647 |
| GB | 2 119 337 A | 11/1983 | |
| WO | WO 2013/116801 A1 | 8/2013 | |

\* cited by examiner

PRODUCT DISTRIBUTION UNIT

The invention relates to a product distribution unit according to the preamble of claim 1 and to a method for product distribution according to the preamble of claim 2.

In the context of the present application, the term "product distribution" refers to the removal of products from a main conveyor and delivery of the removed products to a distribution conveyor, which generally extends transversely to the main conveyor. A product distribution unit is therefore a unit that enables, supports, improves, simplifies, etc., the distribution of products. Conveyors are usually belts with which products, particularly storage-stable piece goods, are conveyed and handled.

One typical area of application for such devices is the production and packaging of confectioneries, such as chocolate blocks and bars, biscuits, granola bars, cupcakes, muffins, cakes, baked goods of all kinds, etc. The products, which are usually produced in rows, must travel a short path in reaching the packaging machine. An arrangement thus emerges in which the rows of products arrive at a wide main belt (processing belt), for example from production, are then removed with a product distribution unit from the flow being conveyed on the main belt and finally fed to a discharge belt of a packaging machine extending transversely to the main belt. As many product distribution units and discharge belts can be arranged along a main belt as are required in order for the required number of packaging machines to be able to package the entire output of products produced. The main belt generally does not consist of one continuous belt, but of several successively arranged belts, some of which are provided as diverting conveyors with retractable belt noses for diverting products away from the product flow.

There are basically two types of product distribution, namely direct distribution and indirect distribution. In direct distribution, the rows of products to be distributed are always fed directly onto the discharge belt, particularly any time that the latter is empty over the required length. Depending on the packaging capacity, either each successive row can be delivered to the main belt, or every other row, every third row, etc. Systematically speaking, it is therefore only possible to discharge an integrally divisible proportion from the flow.

The other categorical type of product distribution is indirect distribution of the rows of products from the product flow. Here, the rows of products first travel to a buffer area before they are fed onto the discharge belt. This offers the advantage that more than one row can be handled at the same time in the product distribution unit. While one row is leaving the discharge belt, it is thus possible to remove another row from the flow and prebuffer it until the discharge belt is free and can be loaded with this prebuffered row. This indirect loading therefore offers the systematic advantage that any proportion of rows can be removed from the flow and loaded onto the packaging machine. For example, two successive rows can be removed from the flow, even alternately. As a result, the packaging speed need not always be an integral divisor of the production speed; rather, it is independent of the flow rate and thus variable. The product distribution unit according to the invention employs indirect distribution. In this unit, the aforementioned possibility of buffering one or even several rows of products is integrated.

Besides this distinction between direct and indirect distribution, there is another distinction to be drawn with respect to the manner in which the products are transferred from one belt to the next. So-called "shooting" [Aufschiessen] refers to a manner of transferring products in which the products fed to the transfer area at a defined speed "shoot" beyond the nose of the feeding belt due to their inertia and are thus placed onto the subsequent belt. Solid products with a firm consistency, primarily chocolate blocks and bars and backed hard biscuits, are suitable for this type of feeding. On the other hand, so-called "laying" refers to a manner of transferring products in which the nose of the belt is retracted at the speed inverse to its conveying speed, thus resulting in gentle placement of the product. This type of product delivery is suitable particularly for products having a soft consistency, are not stowable, and can really only be conveyed.

Finally, there is yet another type of product delivery in which the products are pushed by means of a slide or the like from a belt or from another type of buffer onto the downstream belt. This type of product delivery is faulty in several respects and unsuitable for many types of product.

Both direct and indirect distribution devices are known from the prior art. In the known indirect devices, the buffer area is usually located on a plate on which the rows of products from the main belt are placed and from which they, as mentioned previously, are pushed onto the discharge belt. Devices are also known in which the buffer area is formed by an additional belt running parallel to the main conveyor.

The known devices cannot be adapted to all currently existing requirements with respect to product handling. It is therefore the object of the invention to propose a product distribution unit whose flexibility enables it to meet the demands placed on such devices.

According to the invention, this object is achieved by a product distribution unit with the features of the characterizing part of claim 1 and by a product distribution method with the features of the characterizing part of claim 8.

Preferred exemplary embodiments of the invention will be described below with reference to the enclosed schematic drawings.

FIGS. 3a-f show a series of functional steps during the shooting-over of a product;

FIGS. 4a-g show a series of functional steps during the laying of a product;

FIGS. 5a-h show a series of functional steps during the laying of a product according to another embodiment of the invention;

FIGS. 7a-g show a series of functional steps of the indirect return feed from the overflow belt;

FIGS. 8a-g show a series of functional steps of the direct return feed from the overflow belt.

Figure 1:
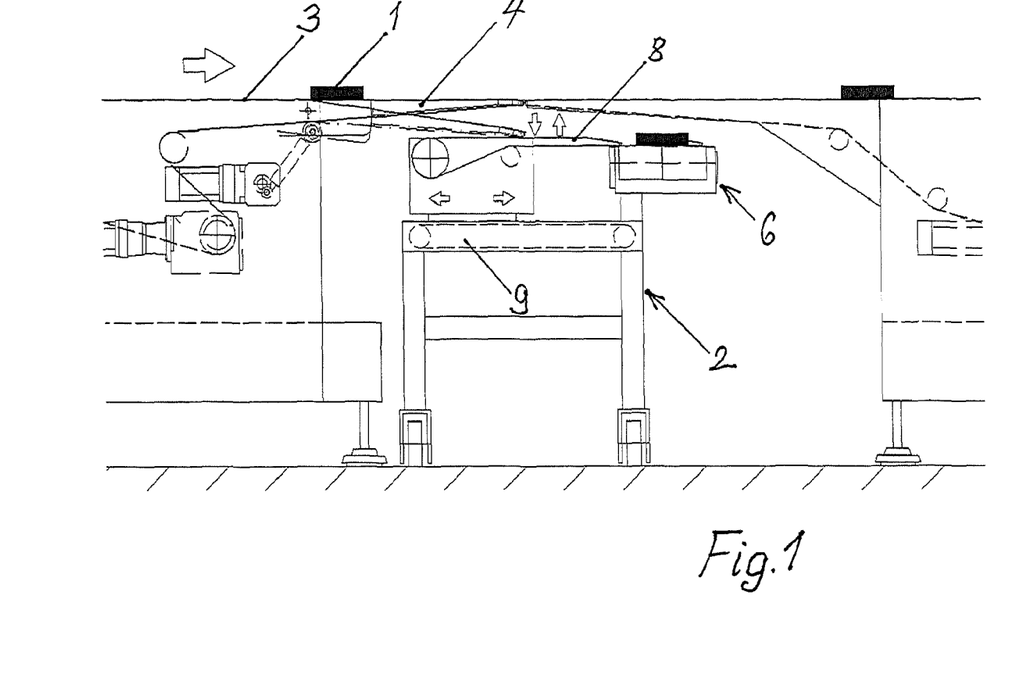
FIG. 1 shows a product distribution unit with a waiting belt in its relationship to a main belt and a discharge belt.
Figures 2A, 2B:
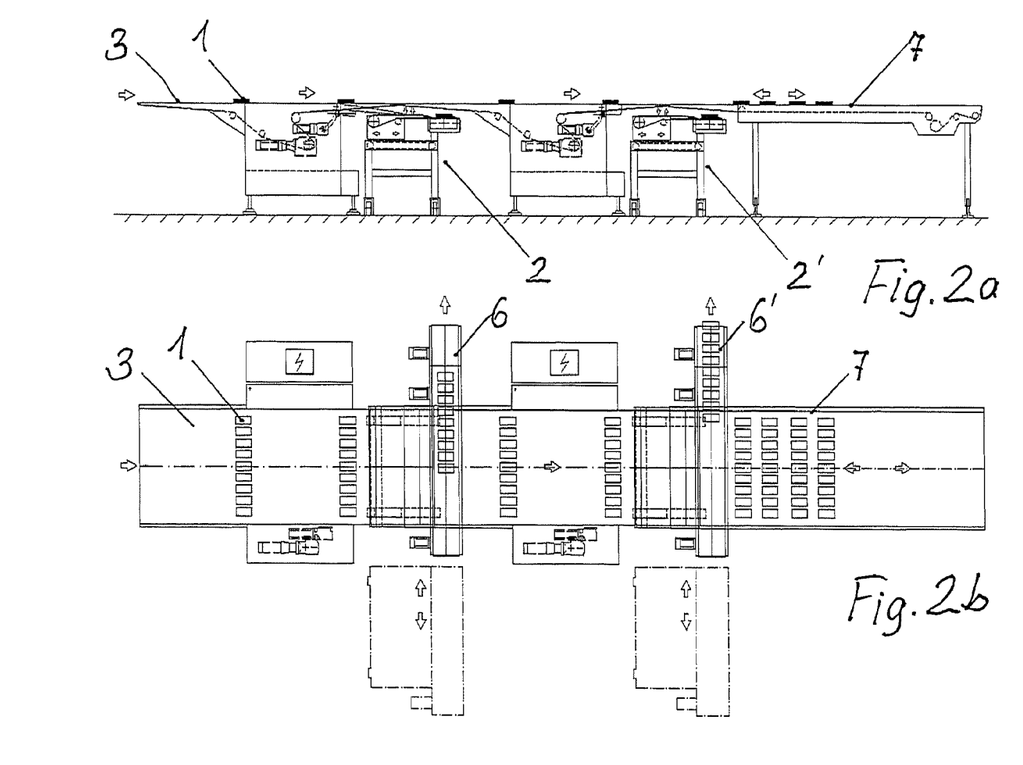
FIG. 2 shows an entire system with two distribution units and an overflow belt a) in a side view and b) in a top view.

FIG. 1 shows a partial view and FIG. 2 an overall view of a system for conveying products 1 from a production facility (not shown) to one or more packaging machines (not shown), with the system comprising substantially one main belt 3 that conveys the products from production, a discharge belt 6 extending transversely thereto that conveys the products to a packaging machine, and a waiting belt unit 2 that takes over the products from the main belt and delivers them to the discharge belt in a desynchronized manner. As can be seen from the top view of FIG. 2b, the products, which appear as individual items in the side views, are rows of products arranged transversely to the direction of conveyance of the main belt. After the transfer, the rows of products are arranged one after another on the discharge belt 6 extending transversely to the main direction of conveyance and arrive for packaging as a single row.

The waiting belt unit 2 is arranged next to the discharge belt 6 beneath the main belt 3 and consists substantially of the waiting belt 8 itself, which can be standing still or driven at a different speed, and a device 9 for horizontally displacing the belt as a whole in or counter to the main direction of conveyance, i.e., transversely to the discharge belt.

As will be described below, the respective rows of products 1 removed from the flow travel via the waiting belt to the discharge belt, which is arranged transversely to the main direction of conveyance. Over the course of distribution, inherently known gap-closing belts can be integrated, so that the products are fed to the packaging machine in a continuous, uninterrupted product flow at synchronous speed. In order to make this possible at all, especially at higher outputs, the need arises to have at least one row prebuffered in the distribution unit in order to load the packaging machine at variable speeds. With this buffer area for at least one row of products, it is possible for one to remove any desired proportion of rows from the flow and, for another, to bridge over a gap in the product flow, always with the aim of loading the packaging machine with product at the required speed without interruption. It is only this possibility for buffering that makes it possible at all to achieve a certain decoupling from the product flow on the main belt and to load the packaging machine optimally, especially since the product flow on the main belt can be discontinuous and have many gaps.

Figure 3:
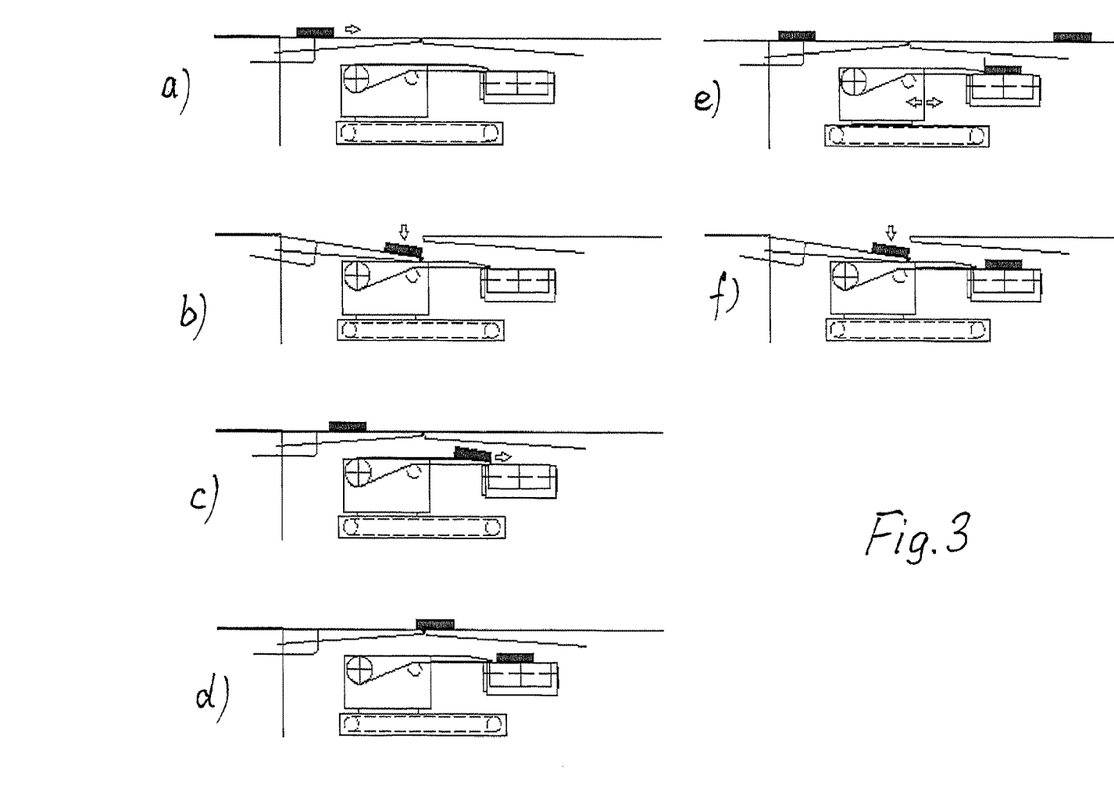

The main belt 3 is functionally conceived as a discharge separator. Its outlet-side belt nose 4 is embodied so as to be vertically swivelable. With this discharge separator, a row of products can be removed from the flow and conveyed to the waiting belt 8 below. The waiting belt can receive and prebuffer one or more rows. The individual steps of this procedure are illustrated in FIG. 3. A row of products (a) arriving in the product flow is conducted onto the waiting belt through lowering of the nose 4 of the main belt (b), conveyed on its outlet-side belt nose (c), and then conveyed onto the transverse discharge belt (d). For this purpose, the row of products is accelerated on the waiting belt only enough that the speed of the row of products is then sufficient to come to rest in the center of the discharge belt. The horizontally displaceable waiting belt can be positioned in a product-optimized manner for this purpose with its outlet-side belt nose relative to the center of the discharge belt so that the row of products can be loaded onto the discharge belt as gently as possible. As soon as the row of products is lying completely on the discharge belt, the horizontally displaceable waiting belt can be moved forward in the main direction of conveyance toward the product, thereby aligning the row of products already located on the discharge belt (e). The next row of products can then be transferred to the waiting belt (f).

Due to the proposed arrangement, however, the alignment function is in principle not always necessary. That always depends on the type and dimensions of the product as well as on the required precision of the packaging process. The horizontal movement of the waiting belt is driven using a servomotor, so the aligning process can be optimized for each product. Therefore, no separate product aligner is necessary with this arrangement, because the alignment function can be carried out with the belt nose of the horizontally displaceable waiting belt.

Figure 4:
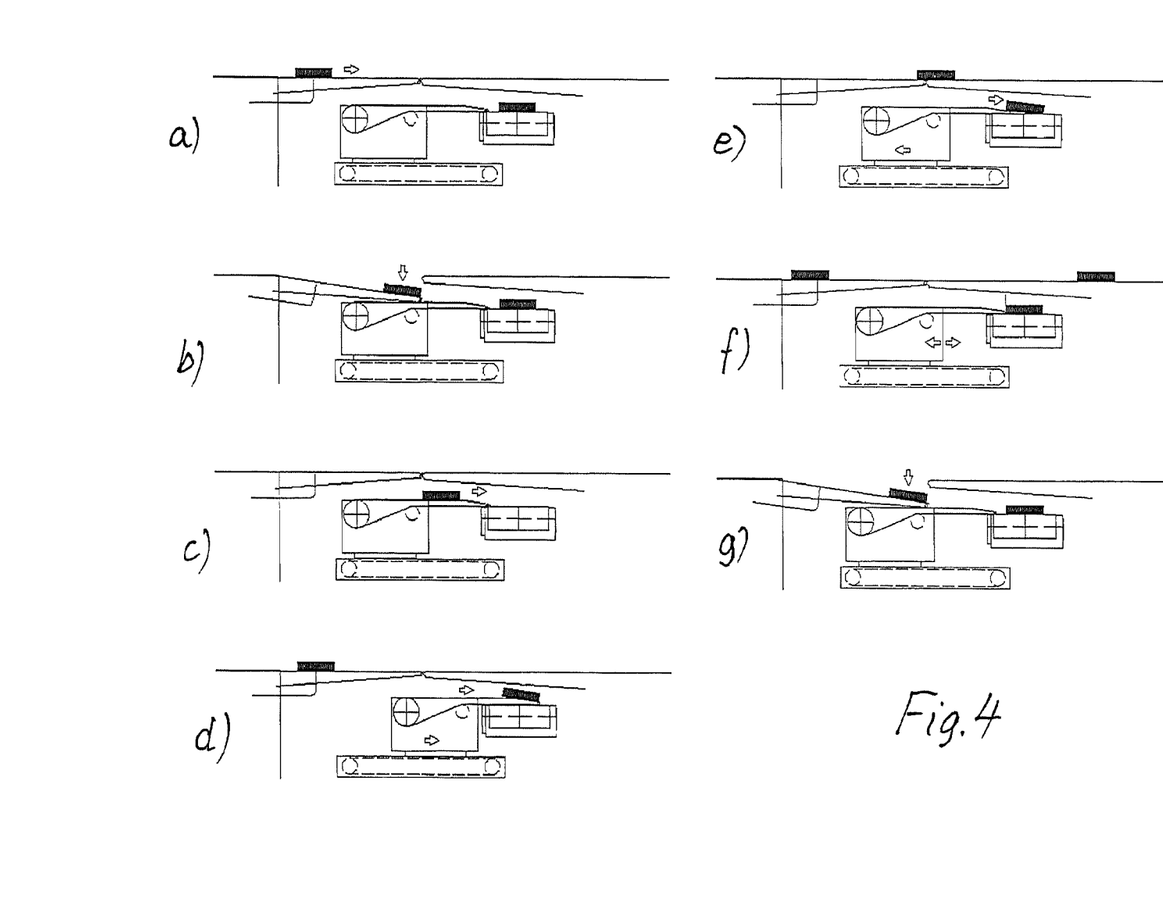

Moreover, the other type of product distribution, i.e., laying, can also be carried out with this arrangement. The products can be laid in place very gently with the horizontally displaceable belt. The individual steps of this function are illustrated in FIGS. 4*a-g*. A row of products (a) arriving in the product flow is conducted onto the waiting belt through lowering of the nose 4 of the main belt (b), conveyed on its outlet-side belt nose (c), and then conveyed onto the transverse discharge belt. For this purpose, the outlet-side belt nose of the waiting belt positions itself so far over the center of the discharge belt that the row of products to be delivered is located over the center of the discharge belt as soon as the row of products has reached the front edge of the waiting belt (d). At this point in time, the entire waiting belt is moved backward precisely at the speed counter to the main direction of conveyance (arrow) that corresponds to the conveying speed of the waiting belt (e). This has the effect that the row of products is then placed in the center of the discharge belt, so that the product itself suffers only insignificant damage. In this way, it is also possible to handle sticky or otherwise sensitive products that typically cannot be shot over in the manner described in the foregoing. After this laying as well, alignment is also possible in the manner described previously (f), if necessary. A next row of products is then transferred to the waiting belt (g).

The structural features of the waiting belt are essential for these functions. It has a very flat outlet-side nose with a length of at least half the width of the discharge belt, a thickness of preferably about 30 mm, and a very small end deflection diameter. If the shooting-over of products is intended, the outlet-side nose can also be shorter. In that way, it is possible to position the flat belt nose as desired in its relative position over the discharge belt. Moreover, the height difference between waiting belt and discharge belt can be kept to a minimum. The row of products to be delivered can thus be loaded onto the discharge belt in an optimal manner.

Both the belt drive and the horizontal movement of the waiting belt are servo-controlled as a function of measured and preset parameters. This control system enables the two different basic feeding types—that is, the described shooting-over for high-capacity solid products on the one hand and the gentle and product-friendly laying of the rows through the possibility of the retraction of the waiting belt during delivery onto the discharge belt. In addition, it is possible to combine or overlay the two feeding types. This is valuable in the case of products that are too long to shoot over and could otherwise only be delivered using a separate slide. Another central advantage is the alignment function. The alignment function is achieved by positioning the flat outlet-side belt nose in the main direction of conveyance against the row of products located on the discharge belt. This alignment pass can be adjusted to the horizontal movement of the waiting belt for each product length using the servo drive. It is thus possible to carry out indirect product distribution by combining two different feeding types using this arrangement (shooting-over or laying) and also to carry out the alignment function without a separate slide or aligner. Storage-stable piece goods with a wide variety of dimensions and consistencies can thus be delivered.

Using the servo control, it is possible at startup to determine and store in the control system all values required for operation for each product type and product dimension that passes through the system. During operation of the system, the corresponding dataset can then be activated in the control via the corresponding product prefix. No additional settings or exchangeable parts of any kind are required for this, and a product changeover can be performed without any loss of time. This increases the line efficiency.

Figure 5:
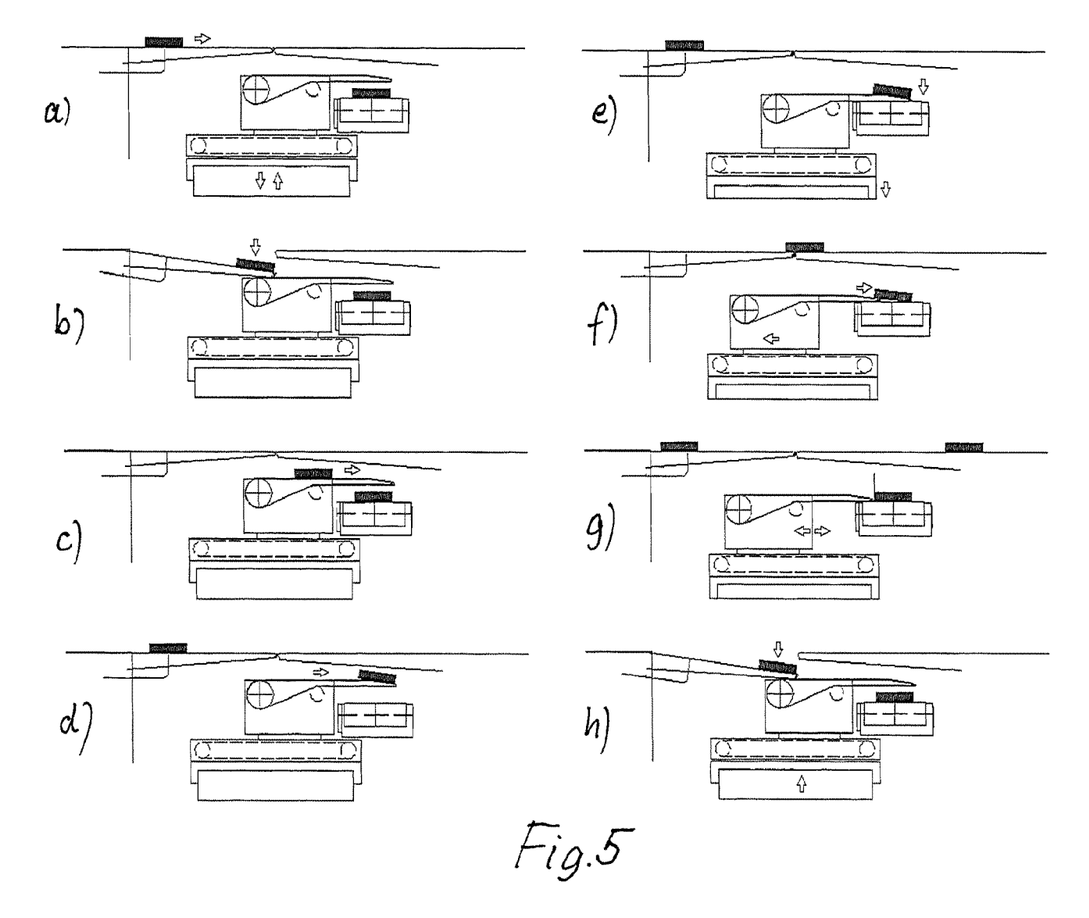

In another embodiment, the horizontally displaceable waiting belt is additionally height-adjustable. This results in the advantage of even greater delivery capacity. The individual steps of this function with this embodiment are illustrated in FIGS. 5a-h. The belt nose of the waiting belt is already positioned over the discharge belt while the previously delivered row of products is still traveling in the direction of the packaging machine (a). An incoming row of products is deposited on the waiting belt (b) and conveyed to the end of the nose, still before the discharge belt is free (c). As soon as the discharge belt is free (d), the waiting belt is lowered (e) and the row of products is laid in the previously described manner (f) and optionally aligned (g). The waiting belt then travels again into the initial position in order to take over another row of products (h). In the previously described arrangement, in which the waiting belt can be displaced only horizontally, it is necessary to hold off on the feeding process until the discharge belt is empty. With the additional height adjustment and the previous positioning of the belt nose over the discharge belt, one gains the span of time that is required until the belt nose of the waiting belt is positioned in the proper position over the discharge belt. The height-adjustability of the outlet-side belt nose can also be achieved through a vertical swiveling movement of the waiting belt.

In another design variant, the substructure of the waiting belt located beneath the main belts and of the discharge belt can be embodied such that it becomes possible to pull these two belts transversely out in the direction of the opposite side of the packaging machines, for example on rollers. This pulling-out can also be achieved with telescopic rails, for example. This process is usually carried out manually. However, it can also be carried out in an automated manner. This lateral extendibility ensures optimal accessibility to the mechanisms located under the main belts for service and cleaning activities, not only after production but also even still during production.

The product distribution unit has a control cabinet in which all actuators and sensors that are necessary for its operation are linked by hardware and software and controlled. By way of a product prefix on the display of the control unit, all of the product types traveling over the product distribution unit can be driven. For this purpose, all of the parameters for the different products traveling over the unit must have been set and stored in a previous startup.

Figure 6:
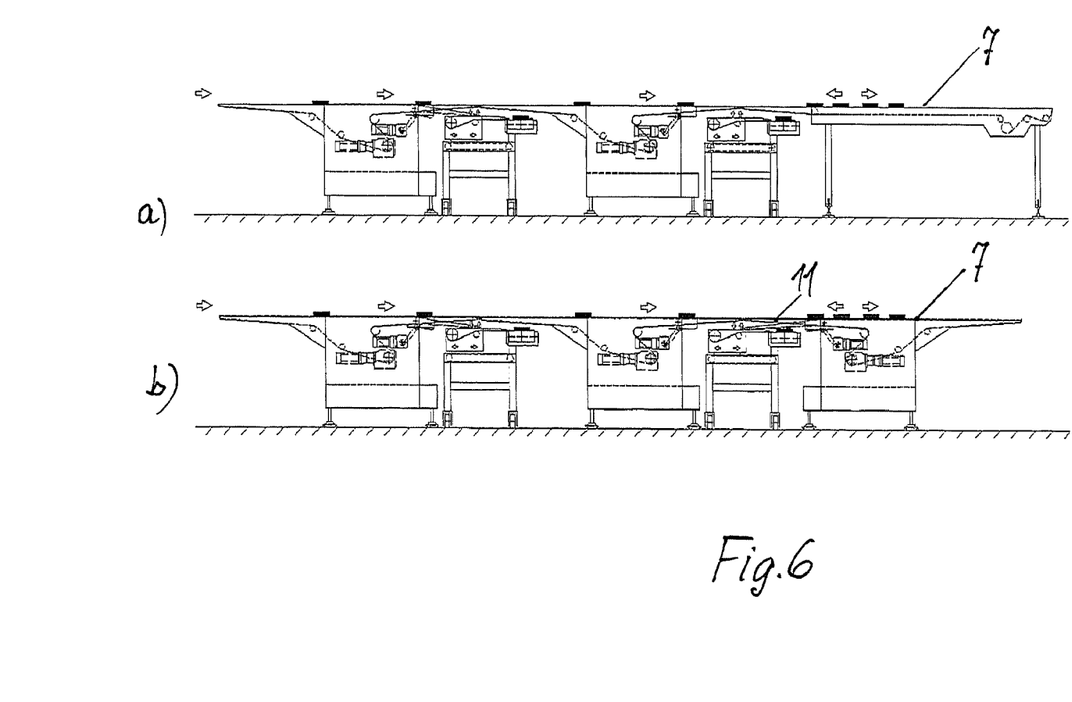
FIGS. 6a and 6b show the function of the indirect and direct return feed from the overflow belt.

Another demand placed on the product distribution unit is defined by the overflowing of rows of products on the line. All of the rows of products produced that have not been able to be allocated to the packaging machines with the successively arranged product distribution units, for example because the packaging machines were not able to receive them due to a fault, they typically travel onto an overflow belt at the end of the line and are advanced and buffered there. As soon as the packaging machine at the end of the line is available again, the possibility exists of delivering these rows of products to that machine again. This return feed is referred to in technical jargon as "refeed." During this refeed, there are basically the two operating modes shown in FIG. 6, namely indirect refeed and direct refeed.

Figure 7:
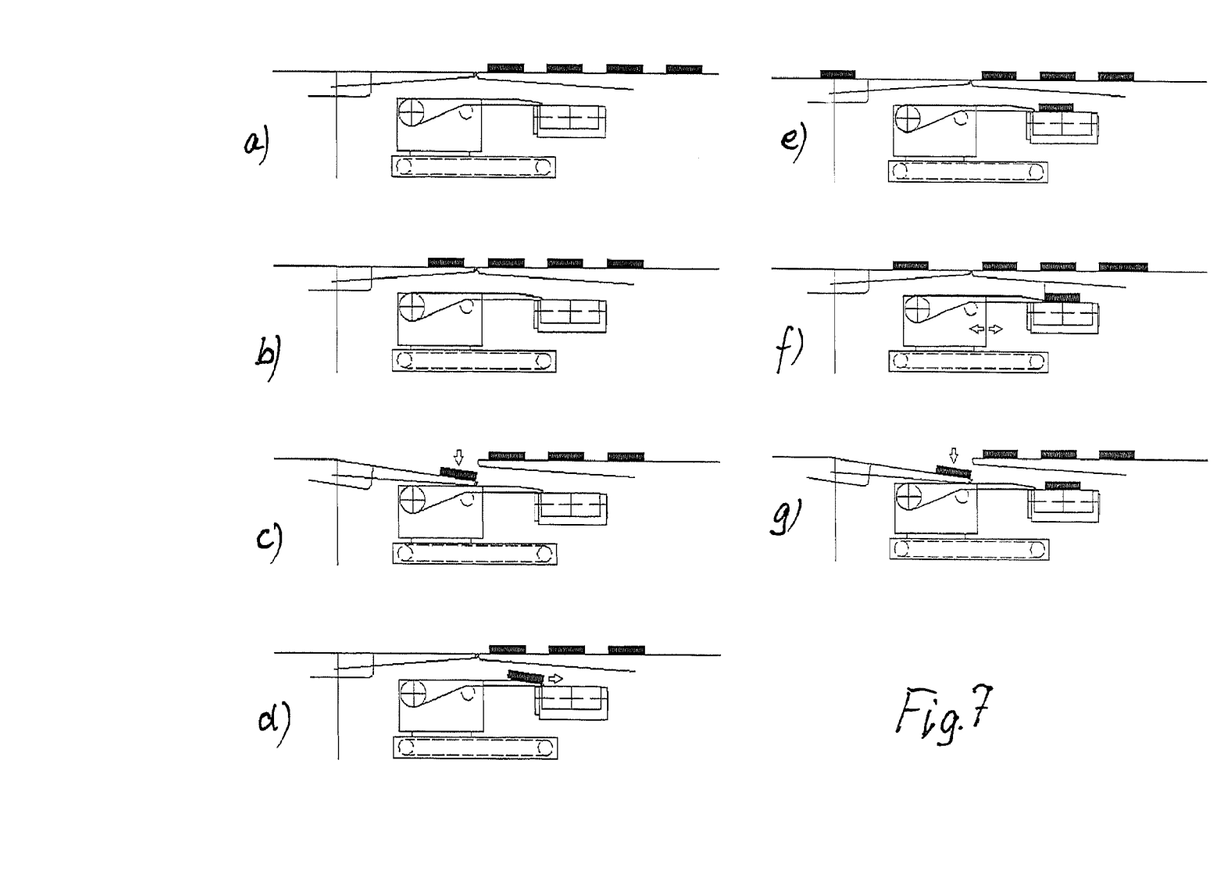

During indirect refeed as shown in FIG. 6a and FIGS. 7a-g, the overflow is conducted to a stationary belt (FIG. 7a). In refeed mode, this belt returns the buffered rows of products in reverse, that is, counter to the main direction of conveyance, row by row onto the diverting conveyor (main belt) of the respective product distribution unit. For this purpose, the diverting conveyor must also travel backwards by one product length in order to be able to receive the respective row of products (7b). The diverting conveyor now delivers this row of products onto the waiting belt below (7c), from where the discharge belt is loaded in turn with this row of products (7d). Subsequently, a product arriving in the normal manner can be laid onto the waiting belt in the previously described manner (7e-g). In this way, the overflow of rows of products that has occurred can be returned row by row to the last packaging machine. However, no rows can travel into the last product distribution unit during this time from the front, i.e., from the main direction of conveyance, since a jam can otherwise occur; after all, the diverting conveyor of the product distribution unit must travel backwards during this indirect refeed mode. This indirect refeed mode is usually activated at the end of production or during interruptions of production, or if the last machine was defined as a standby machine during the designing of the packaging line that takes on the products of an upstream machine only in the case of a stoppage.

One of the essential advantages of the installation according to the invention with respect to the refeed function is that no additional mechanisms of any kind are required in order to ensure the delivery and alignment functions. In conventional systems, mechanical take-off devices and aligners are normally required which must be installed above the plane of conveyance in order to produce the delivery function. Precisely this additional mechanism then poses a nuisance in direct refeed mode. With the product distribution unit according to the invention, no such additional mechanism is present, thus enabling a very efficient arrangement for producing the direct refeed mode.

Figure 8:
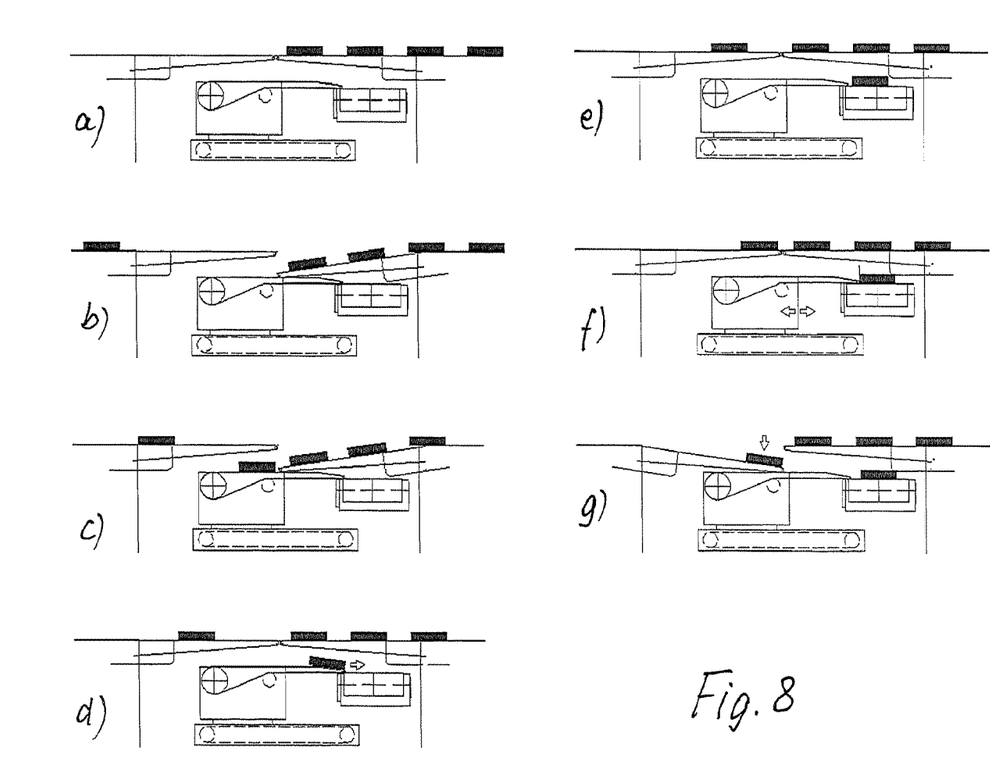

As shown in FIG. 6b and FIGS. 8a-g, a conversely disposed diverting conveyor 11 is arranged downstream from the last product distribution unit that receives the overflowing rows of products in a timed manner (FIG. 8a). This makes it possible to dynamically return an overflowed row into a gap in the incoming product flow (8b). The diverting conveyor of the respective product distribution unit can continue to run in the main direction of conveyance, since the conversely disposed diverting conveyor delivers the overflowed row to the waiting belt below (8c). Meanwhile, the waiting belt runs backwards, i.e., counter to the main direction of conveyance, in order to receive the row in a defined manner. The conversely disposed diverting conveyor moves its swivelable belt nose upward again, so that the waiting belt can deliver the row of products in an appropriate manner to the discharge belt (as described previously) (8d). In this refeed mode, production can continue (8e-g), since as soon as a suitable gap appears, a row can be fed immediately back into that gap. Oftentimes, a gap is also produced systematically in the product flow by means of upstream dynamic belts into which an overflowed row of products can be fed back in a defined manner in direct refeed mode. These refeed possibilities are becoming more and more important; after all, particularly in the case of valuable products, it is desirable to be able to efficiently return the overflow in an automated manner in order to prevent losses.

The invention claimed is:

1. A product distribution unit for removing rows of products from a production flow conveyed on a main conveyor and feeding them to a packaging machine, comprising:
 a waiting belt unit arranged beneath the main conveyor, the waiting belt unit comprising:
  a waiting belt having a main direction of conveyance which is equal to the direction of conveyance of the main conveyor, the waiting belt taking over rows of products from the main conveyor and conveying the rows of products in the main direction to a discharge belt, and a servo-controlled device horizontally displacing the waiting belt unit as a whole in or against the main direction of conveyance.

2. The product distribution unit as set forth in claim 1, wherein the waiting belt includes a flat, outlet-side belt nose having a length corresponding to at least half the width of the discharge belt, a thickness of about 30 mm, and an end deflection diameter of no more than 25 mm.

3. The product distribution unit as set forth in claim 1, wherein the waiting belt is vertically displaceable.

4. The product distribution unit as set forth in claim 1, wherein the waiting belt comprises an outlet-side belt nose which due to horizontal displacement of the waiting belt unit is placeable over the discharge belt.

5. The product distribution unit as set forth in claim 4, wherein the horizontal displacement of the outlet side belt nose of the waiting belt is applied for aligning a row of products delivered to the discharge belt.

6. The product distribution unit as set forth in claim 1, wherein the waiting belt moving in a direction against the main direction receives rows of products conveyed counter to the main direction of conveyance.

7. The product distribution unit as set forth in claim 1, wherein a surface of the waiting belt on which the products are placed is raised or lowered while the surface maintains a constant orientation.

8. A product distribution method comprising:
removing rows of products from a production flow conveyed on a main conveyor,
feeding the rows of products to a packaging machine, and
implementing different feeding types by coordinating a belt path of a waiting belt unit and a horizontal displacement of the waiting belt unit as a whole,
wherein the waiting belt unit comprises a waiting belt, and a surface of the waiting belt on which the products are placed is raised or lowered while the surface maintains a constant orientation.

9. The product distribution method as set forth in claim 8, wherein two feeding types are overlaid using a displaceable waiting belt.

* * * * *